United States Patent
Chung

(10) Patent No.: US 10,219,348 B1
(45) Date of Patent: Feb. 26, 2019

(54) LED FAULT DETECTION CIRCUIT AND LED CONTROL CIRCUIT USING THE SAME

(71) Applicant: ANPEC ELECTRONICS CORPORATION, Hsinchu (TW)

(72) Inventor: Jui-Chu Chung, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 15/959,493

(22) Filed: Apr. 23, 2018

(30) Foreign Application Priority Data

Jan. 31, 2018 (TW) .............................. 107103459 A

(51) Int. Cl.
H05B 33/08 (2006.01)

(52) U.S. Cl.
CPC ....... H05B 33/089 (2013.01); H05B 33/0809 (2013.01)

(58) Field of Classification Search
CPC ... H05B 33/089; H05B 33/0809; H05B 37/02
USPC .......................................................... 315/193
See application file for complete search history.

(56) References Cited

U.S. PATENT DOCUMENTS

| | | | | |
|---|---|---|---|---|
| 8,334,662 B2* | 12/2012 | Jin | ..................... | H05B 33/0818 315/299 |
| 9,451,664 B2* | 9/2016 | Jin | ..................... | H05B 33/0818 |
| 2011/0062872 A1* | 3/2011 | Jin | ..................... | H05B 33/0818 315/122 |
| 2012/0074868 A1* | 3/2012 | Tseng | ................. | H05B 33/0815 315/294 |
| 2013/0127344 A1* | 5/2013 | Jin | ..................... | H05B 33/0818 315/122 |
| 2014/0168567 A1* | 6/2014 | Kikuchi | ............. | H05B 33/0815 349/61 |
| 2016/0081148 A1* | 3/2016 | Liang | ................... | H05B 33/089 324/414 |

\* cited by examiner

*Primary Examiner* — Daniel D Chang
(74) *Attorney, Agent, or Firm* — Li & Cai Intellectual Property (USA) Office

(57) ABSTRACT

Disclosed is an LED fault detection circuit, including a current source, a detection resistor and a first circuit, coupled between an LED string and an LED driving circuit. The current source provides a first current. A first end of the detection resistor is coupled to a node between the LED string and the LED driving circuit, and a second end of the detection resistor is coupled to the current source. The first circuit is coupled to the current source and the detection resistor. After the LED string is driven by the LED driving circuit, a detection current flows through the detection resistor. Then, the first circuit generates a fault detection signal according to the sum of the first current and the detection current. As a response, the LED driving circuit stops driving or continues to drive the LED string according to the fault detection signal.

16 Claims, 3 Drawing Sheets

LED FAULT DETECTION CIRCUIT AND LED CONTROL CIRCUIT USING THE SAME

BACKGROUND OF THE INVENTION

1. Field of the Invention

The present disclosure relates to an LED fault detection circuit and an LED control circuit using the same; in particular, to an LED fault detection circuit and an LED control circuit using the same that can simultaneously detect the occurrence of a short circuit and an open circuit in LED strings.

2. Description of Related Art

Currently, LEDs are widely used in backlight modules of electronic devices. A large amount of LED strings are used in a backlight module of these electronic devices. Thus, a detection circuit is needed to detect the working states of the LED strings for determining whether any LED of the LED strings is short-circuited or open-circuited, because an LED the backlight module may not work normally when this occurs.

However, usually, a detection circuit can only be designed to detect whether any LEDs of the LED strings are either short-circuited or open-circuited. So far, no detection circuit has been designed for simultaneously detecting a short circuit and an open circuit in the LED strings. Additionally, most detection circuits detect whether any LED of the LED strings is short-circuited or open-circuited by detecting the voltage at the node between the LED string and the LED driving circuit. In this manner, circuit elements of the detection circuit have to be high-voltage circuit elements, or they may be damaged when the detection circuit operates at a high voltage. Therefore, the manufacturing cost of the detection circuit is increased by using the high-voltage circuit elements.

SUMMARY OF THE INVENTION

To overcome the disadvantages described above, the present disclosure provides an LED fault detection circuit. The LED fault detection circuit is coupled between an LED string and an LED driving circuit, and includes a current source, a detection resistor and a first circuit. The current source provides a first current. A first end of the detection resistor is coupled to a node between the LED string and the LED driving circuit, and a second end of the detection resistor is coupled to the current source. The first circuit is coupled to the current source and the detection resistor. After the LED string is driven by the LED driving circuit, a detection current flows through the detection resistor. Then, the first circuit generates a fault detection signal according to the sum of the first current and the detection current. As a response, the LED driving circuit stops driving or continues to drive the LED string according to the fault detection signal.

In addition, the present disclosure provides an LED control circuit. The LED control circuit includes an LED driving circuit and an LED fault detection circuit described above. The LED driving circuit is coupled to an LED string. The LED fault detection circuit is coupled between the LED string and the LED driving circuit. After the LED string is driven by the LED driving circuit, a detection current flows through the detection resistor. Then, the first circuit generates a fault detection signal according to the sum of the first current and the detection current. As a response, the LED driving circuit stops driving or continues to drive the LED string according to the fault detection signal.

Moreover, the present disclosure provides another LED control circuit. The LED control circuit includes a plurality of LED driving circuits and an LED fault detection circuit. Each LED driving circuit is coupled to an LED string. Through a plurality of switch units, the LED fault detection circuit is coupled between each of the LED strings and the LED driving circuit coupled to the LED string. The LED fault detection circuit includes a current source, a detection resistor and a first circuit. The current source provides a first current. Through the switch units, a first end of the detection resistor is coupled to a node between each of the LED strings and the LED driving circuit coupled to the LED string. A second end of the detection resistor is coupled to the current source. The first circuit is coupled to the current source and the detection resistor. After the LED strings are driven by the LED driving circuit, a detection current flows through the detection resistor when at least one LED of one of the LED strings forms a short circuit. The first circuit generates a fault detection signal according to the sum of the first current and the detection current. As a response, the LED driving circuit continues to drive or stops driving the one of the LED strings according to the fault detection signal.

Due to the circuit configuration and the working principle of the present disclosure described above, a short circuit and an open circuit occurring in LED strings can both be detected according to a fault detection signal generated by the present disclosure. Then, as a response, by the control of a system terminal, the present disclosure can stop driving or continue to drive the LED string having an LED being short-circuited, or can disable an LED driving circuit coupled to the LED string having an LED that forms an open circuit.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

It will be understood that, although the terms first, second, third, and the like, may be used herein to describe various elements, these elements should not be limited by these terms. These terms are only to distinguish one element from another element, and the first element discussed below could be termed a second element without departing from the teachings of the instant disclosure. As used herein, the term "and/or" includes any and all combinations of one or more of the associated listed items.

Figure 1:
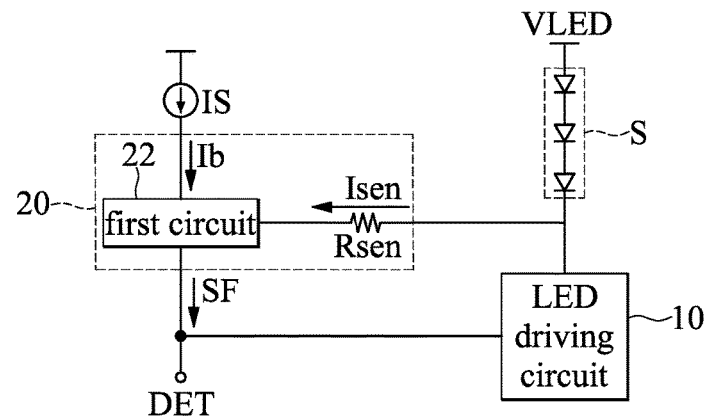
FIG. 1 shows a block diagram of an LED fault detection circuit and an LED control circuit using the same according to one embodiment of the present disclosure.

Referring to FIG. 1, a block diagram of a LED fault detection circuit and an LED control circuit using the same according to one embodiment of the present disclosure is shown.

The LED control circuit is configured to control an LED string. As shown in FIG. 1, the LED control circuit in this embodiment includes an LED driving circuit 10 and an LED fault detection circuit 20. The LED fault detection circuit 20 is coupled between the LED string S and the LED driving circuit 10, and includes a current source IS, a detection resistor Rsen and a first circuit 22. A first end of the detection resistor Rsen is coupled to a node between the LED string S and the LED driving circuit 10, and a second end of the detection resistor Rsen is coupled to the current source IS. In addition, the first circuit 22 is coupled to the current source IS and the detection resistor Rsen.

The working principle of the LED fault detection circuit 20 and the LED control circuit in this embodiment is described as follows. After the LED string S is driven by the LED driving circuit 10, a detection current Isen flows through the detection resistor Rsen. Then, the first circuit 22 generates a detection current ILED according to the sum of a first current Ib and the detection current Isen, such that a system terminal can obtain a fault detection signal SF from a detection pin DET. The LED driving circuit 10 can be controlled by the system terminal, and thus as a response, the LED driving circuit 10 will stop driving or continue to drive the LED string S according to the fault detection signal SF.

The circuit configuration of the LED fault detection circuit 20 and the LED control circuit in this embodiment is described in the following descriptions.

Figure 2:
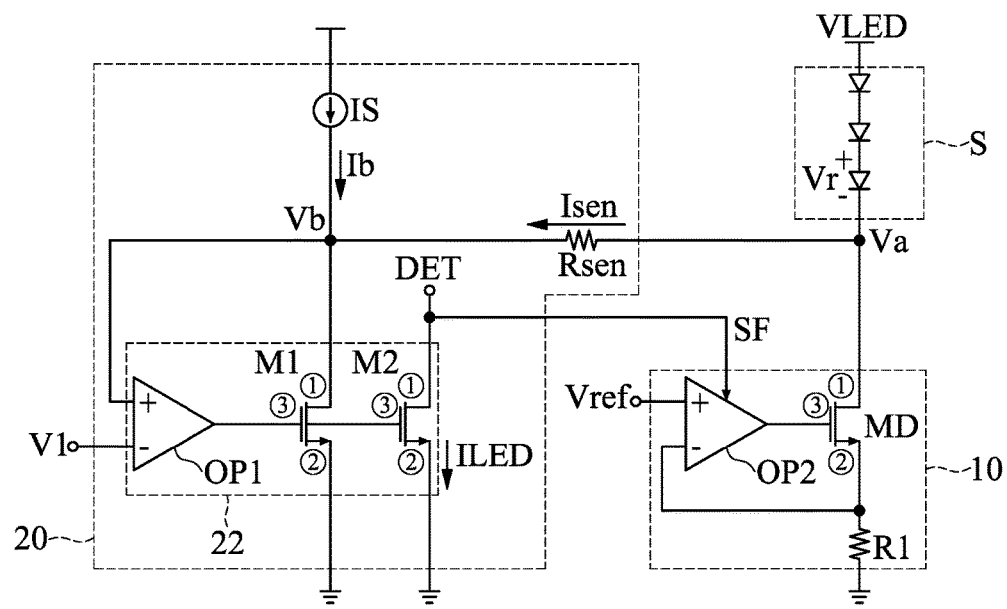
FIG. 2 shows a circuit diagram of an LED fault detection circuit and an LED control circuit using the same according to one embodiment of the present disclosure.

Referring to FIG. 2, a circuit diagram of an LED fault detection circuit and an LED control circuit using the same according to one embodiment of the present disclosure is shown.

As shown in FIG. 2, the LED fault detection circuit 20 includes a current source IS, a detection resistor Rsen and a first circuit 22. The first circuit 22 includes a first transistor M1, a second transistor M2 and a first operational amplifier OP1. The first transistor M1 and the second transistor M2 form a current mirror. The inverting input end of the first operational amplifier OP1 receives a first voltage V1, the non-inverting input end of the first operational amplifier OP1 is coupled to the current source IS and the second end of the detection resistor Rsen, and the output end of the first operational amplifier OP1 is coupled to the current mirror.

In the current mirror that includes the first transistor M1 and the second transistor M2, a first end of the first transistor M1 is coupled to the current source IS and the second end of the detection resistor Rsen, a second end of the first transistor M1 is grounded, and a third end of the first transistor M1 is coupled to the output end of the first operational amplifier OP1. In addition, a first end of the second transistor M2 is coupled to a detection pin DET for outputting the fault detection signal SF, a second end of the second transistor M2 is grounded, and a third end of the second transistor M2 is coupled to the third end of the first transistor M1.

Moreover, the LED driving circuit 10 includes a driving transistor MD and a second operational amplifier OP2. A first end of the driving transistor MD is coupled to the LED string S and the LED fault detection circuit 20, and a second end of the riving transistor MD is grounded through a resistor R1. The non-inverting input end of the second operational amplifier OP2 receives a reference Vref, the inverting input end of the second operational amplifier OP2 is coupled to the second end of the driving transistor MD, and the output end of the second operational amplifier OP2 is coupled to a third end of the driving transistor MD. For ease of illustration, in FIG. 2, the first ends of the first transistor M1, the second transistor M2 and the driving transistor MD are marked by ①, the second ends of the first transistor M1, the second transistor M2 and the driving transistor MD are marked by ②, and the third ends of the first transistor M1, the second transistor M2 and the driving transistor MD are marked by ③.

In the LED fault detection circuit 20 of the LED control circuit, due to the current mirror that includes the first transistor M1 and the second transistor M2, the first circuit 22 generates a fault detection current ILED according to the sum of the first current Ib and a detection current Isen, such that the system terminal can obtain the fault detection signal SF according to the fault detection current ILED. The LED driving circuit 10 can be controlled by the system terminal, and thus as a response, the LED driving circuit 10 will stop driving or continue to drive the LED string S according to the fault detection signal SF.

The working principle of the LED fault detection circuit 20 and the LED control circuit in this embodiment is described in the following descriptions.

According to FIG. 2, the voltage of the node Vb is clamped at the first voltage V1 due to the first operational amplifier OP1. After the driving transistor MD in the LED driving circuit 10 is turned on, the LED string S is driven. Then, once the voltage at the node Va is larger than the first voltage V1, a detection current Isen will flow through the detection resistor Rsen. In this case, the first current Ib provided by the current source IS and the detection current Isen both flow to the first transistor M1. The first transistor M1 and the second transistor M2 form a current mirror. The fault detection current ILED will be generated and flow to the second transistor M2 after the detection current Isen and the first current Ib both flow to the first transistor M1. Thus, the system terminal can obtain the fault detection signal SF from the detection pin DET. According to the above descriptions, the fault detection signal SF that the system terminal obtains includes the information of the fault detection current ILED, and the fault detection current ILED and the fault detection signal SF are related to the voltage of the node Va. Therefore, according to the fault detection signal SF, the system terminal can determine whether any LED of the LED string S forms a short circuit or an open circuit, and thus can make the LED control circuit stop driving or continue to drive the LED string S having an LED that forms a short circuit, or can disable an LED driving circuit 10 coupled to the LED string S having an LED that forms an open circuit.

It should be noted that, in this embodiment, the first voltage V1 is designed as a low voltage, and this low voltage is at least smaller than the voltage of the node Va that can be measured when each LED of the LED string S works normally. Since the LED fault detection circuit 20 operates at a low voltage, its circuit elements are unlikely to be damaged by a high voltage, and thus no high-voltage elements are needed.

It should also be noted that, in this embodiment, the ratio of fault detection current ILED and the sum of the first current Ib and the detection current Isen are determined by the sizes of the first transistor M1 and the second transistor M2, but it is not limited thereto.

According to the circuit configuration shown in FIG. 2, when each LED of the LED string S works normally, the fault detection current ILED can be represented by the equation 1 as follows.

$$ILED = m\left(\frac{VLED - V1 - nxVr}{Rsen} + Ib\right) \quad \text{(Equation 1)}$$

In the equation 1, "ILED" is the fault detection current, "m" is the ratio of the sum of the first current Ib and the detection current Isen to the fault detection current ILED, "VLED" is a supply voltage of the LED string S, "V1" is the first voltage, "Rsen" is the detection resistor, "Ib" is the first current, "n" is the number of LEDs of the LED string S, and "Vr" is the voltage drop of each LED. According to the equation 1, the fault detection current ILED is a constant current when each LED of the LED string S works normally. In this embodiment, this constant current is defined as a first preset current. Accordingly, when the fault detection current ILED is equal to the first preset current, the system terminal can determine that the LEDs of the LED string S all work normally according to the fault detection signal SF, and thus the LED control circuit can continue to drive the LED string S.

Also according to the circuit configuration shown in FIG. 2, when the LED string S has at least one LED being a short circuit, the fault detection current ILED can be represented by the equation 2 as follows.

$$ILED = m\left(\frac{VLED - V1 - (n-p)xVr}{Rsen} + Ib\right) \quad \text{(Equation 2)}$$

In the equation 2, "ILED" is the fault detection current, "m" is the ratio of the sum of the first current Ib and the detection current Isen to the fault detection current ILED, "VLED" is a supply voltage of the LED string S, "V1" is the first voltage, "Rsen" is the detection resistor, "Ib" is the first current, "n" is the number of LEDs of the LED string S, "p" is the number of the short LEDs of the LED string S and "Vr" is the voltage drop of each LED. According to the equation 2, when the LED string S has at least one LED being a short circuit, the fault detection current ILED will be larger than the above mentioned first preset current. Accordingly, when the fault detection current ILED is larger than the above mentioned first preset current, the system terminal can determine that the LED string S has at least one LED being short-circuited according to the fault detection signal SF. Furthermore, the system terminal can determine the number of the LEDs of the LED string S, which are short-circuited, according to the fault detection signal SF, because the fault detection current ILED is related to the voltage of the node Va.

However, it should be noted that, when the system terminal determines that the LED string S has at least one LED being short-circuited, it may not make the LED control circuit stop driving the LED string S. Specifically, in this embodiment, the system terminal makes the LED control circuit stop driving the LED string S only when a certain number of LEDs of the LED string S are short-circuited. When there are a certain number of LEDs of the LED string S being short-circuited, the current value of the fault detection current ILED is defined as a second preset current. In this case, the system terminal makes the LED control circuit stop driving the LED string S only when the fault detection current ILED is larger than or equal to the second preset current. Nevertheless, in other embodiments, the definitions of the second preset current can be different. For example, the second preset current may be defined as the current value of the fault detection current ILED when there is one LED of the LED string S being short-circuited. In this case, the system terminal will make the LED control circuit stop driving the LED string S as long as there is one LED of the LED string S being short-circuited. According to the above descriptions, the definition of the second present current is not restricted.

Still according to the circuit configuration shown in FIG. 2, when one LED of the LED string S is an open circuit, the LED driving circuit 10 cannot work effectively. In this case, the driving transistor MD operates in its linear region, such that the fault detection current ILED can be represented by the equation 3 as follows when the voltage of the node Va drops approximately to zero.

$$ILED = m\left(Ib\frac{V1}{Rsen + Rdrive}\right) \quad \text{(Equation 3)}$$

In the equation 3, "ILED" is the fault detection current, "m" is the ratio of the sum of the first current Ib and the detection current Isen to the fault detection current ILED, "V1" is the first voltage, "Ib" is the first current, "Rsen" is the detection resistor, and "Rdrive" is the equivalent resistance of the LED driving circuit 10 (i.e. the sum of the resistance of the resistor R1 and the resistance of the driving transistor MD).

Moreover, according to the circuit configuration shown in FIG. 2, the fault detection current ILED can be represented by the equation 4 as follows when the node Va is short to ground.

$$ILED = m\left(Ib - \frac{V1}{Rsen}\right) \quad \text{(Equation 4)}$$

In the equation 4, "V1" is the first voltage, "Ib" is the first current, "Rsen" is the detection resistor, and "m" is the ratio of the sum of the first current Ib and the detection current Isen to the fault detection current ILED.

According to both of the equation 3 and the equation 4, when one LED of the LED string S is an open circuit or the node Va is short to ground, the fault detection current ILED will be smaller than the first current Ib. Accordingly, when the fault detection current ILED is smaller than the first current Ib, according to the fault detection signal SF, the system terminal can determine that there is one LED of the LED string S being an open circuit or that the node Va is short to ground. In this case, the system terminal can disable the LED driving circuit 10 and may execute other protective measures.

Figure 3:
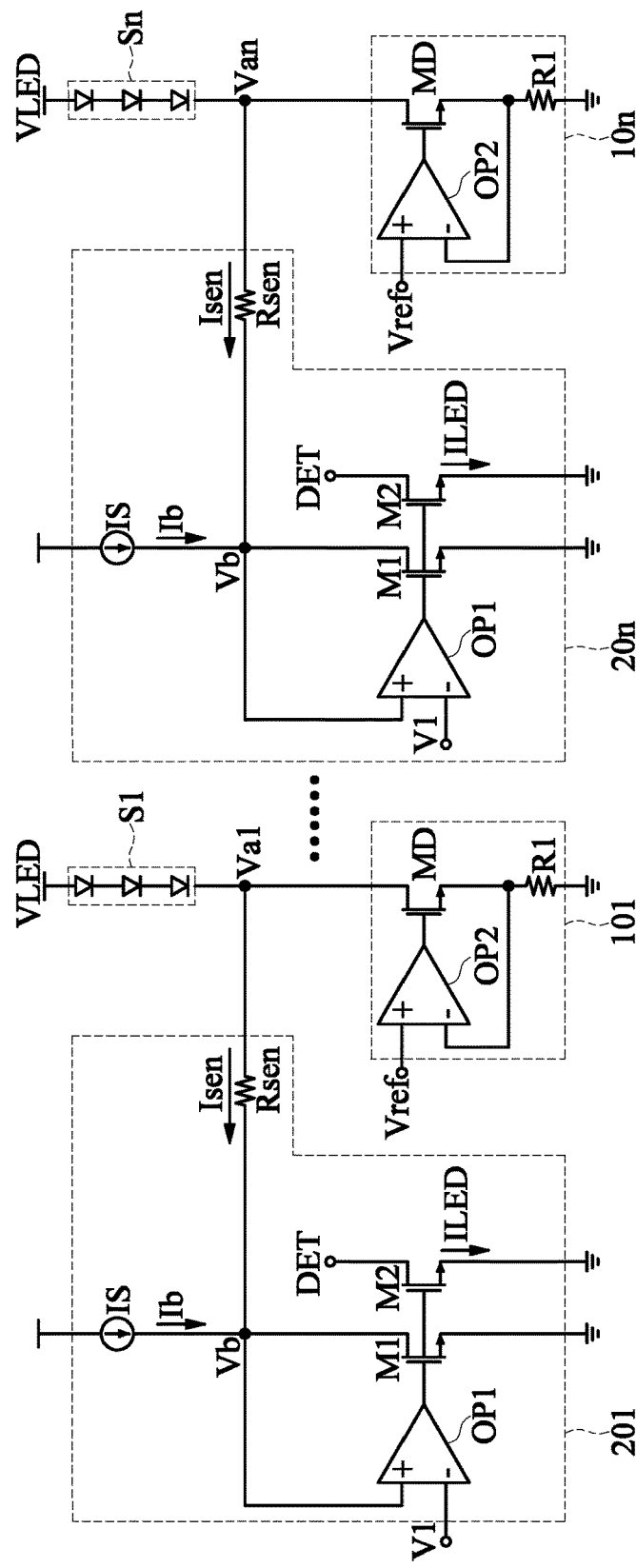
FIG. 3 shows a circuit diagram of an LED control circuit using the same according to one embodiment of the present disclosure.

Although only one set of the LED driving circuit 10 and the LED fault detection circuit 20 is shown in FIG. 2, the number of the set of the LED driving circuit 10 and the LED fault detection circuit 20 is not restricted. In other embodiments, there can be many sets of the LED driving circuit 10 and the LED fault detection circuit 20 in the LED control circuit, and each set of the LED driving circuit 10 and the LED fault detection circuit 20 drives and detects one LED string S. Referring to FIG. 3, a circuit diagram of an LED control circuit using the same according to one embodiment of the present disclosure is shown. As shown in FIG. 3, the LED control circuit includes LED driving circuits 101~10n and LED fault detection circuits S1~Sn. It should be noted that, the working principle of each set of the LED driving circuit and the LED fault detection circuit in the LED control circuit in this embodiment is similar to the working principle of the LED control circuit shown in FIG. 2, and thus descriptions thereof will not be reiterated herein.

Figure 4:
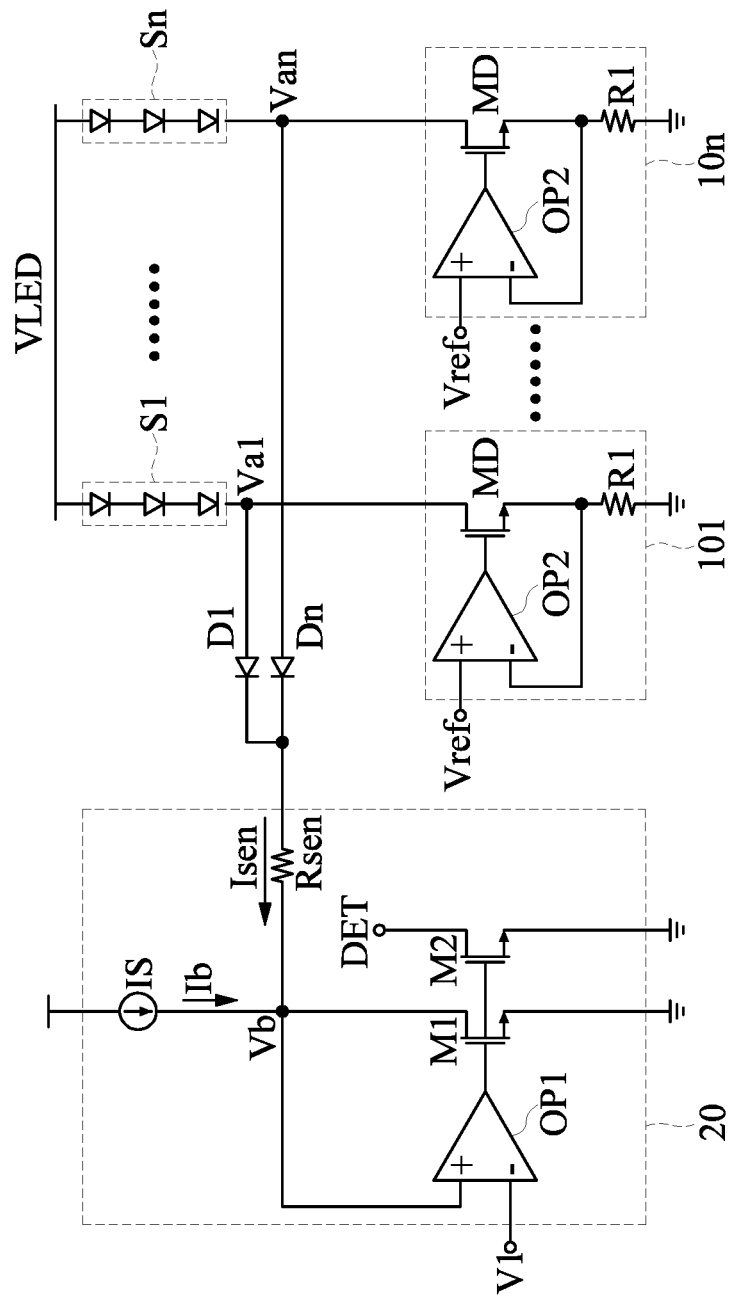
FIG. 4 shows a circuit diagram of an LED control circuit using the same according to another embodiment of the present disclosure.

Referring to FIG. 4, a circuit diagram of an LED control circuit using the same according to another embodiment of the present disclosure is shown.

The LED control circuit in this embodiment is similar to the LED control circuit shown in FIG. 3. In other words, the circuit configuration and the working principle of the LED control circuit in this embodiment are similar to the circuit configuration and the working principle of the LED control circuit shown in FIG. 3. Thus, only differences between the LED control circuit shown in FIG. 3 and the LED control circuit in this embodiment are illustrated in the following descriptions.

The major difference between the LED control circuit shown in FIG. 3 and the LED control circuit in this embodiment is that, the LED control circuit in this embodiment has only one LED fault detection circuit 20. To detect each of the LED strings S1~Sn, through a plurality of switch units, the LED fault detection circuit 20 is coupled between each of the LED strings (i.e. each one of the LED strings S1~Sn) and the LED driving circuit coupled to the LED string (i.e. each of the LED driving circuits 101~10n that is coupled to the one of the LED strings S1~Sn). Specifically, in the LED fault detection circuit 20, through a plurality of switch units D1~Dn, a first end of the detection resistor Rsen is coupled to each of nodes Va1~Van between the LED strings S1~Sn and the LED driving circuits 101~10n coupled respectively to the LED strings S1~Sn, and a second end of the detection resistor Rsen is coupled to the current source IS. In this embodiment, the switch units D1~Dn are diodes, but they are not limited thereto.

The working principle of the LED fault detection circuit 20 and the LED control circuit in this embodiment is that, after the LED driving circuits 101~10n drive the LED strings S1~Sn, when one of the LED strings S1~Sn has at least one LED being shortcircuited, a detection current Isen flows through the detection resistor Rsen. Then, due to a current mirror that includes a first transistor M1 and a second transistor M2, the first circuit 22 generates a detection current Isen according to the sum of the first current Ib and the detection current Isen, such that the system terminal can obtain a fault detection signal from a detection pin DET. As a response, the system terminal makes the LED driving circuits 101~10n continue to drive the LED strings S1~Sn or stop driving one of the LED strings S1~Sn according to the fault detection signal.

According to the circuit configuration shown in FIG. 4, when each LED of the LED strings S1~Sn works normally, the switch units D1~Dn are turned off, and thus there is no detection current Isen. In other words, when each LED of the LED strings S1~Sn works normally, the detection current Isen is zero.

However, when one of the LED strings S1~Sn has at least one LED being short-circuited, the detection current Isen flows through the detection resistor Rsen, and the detection current ILED generated by the first circuit 22 will be larger than the first preset current described in the above embodiments. In this case, the system terminal can determine that, one of the LED stings S1~Sn has an LED (or LEDs) being short-circuited according to the fault detection signal, but it may not make the LED control circuit stop driving the LED string having an LED (or LEDs) being short-circuited. In this embodiment, the system terminal makes the LED control circuit stop driving the LED string S having an LED (or LEDs) being short-circuited when there are a certain number of LEDs of the LED string being short-circuitsed. In other words, the system terminal makes the LED control circuit stop driving the LED string S having an LED (or LEDs) being short-circuited according to the fault detection signal only when the detection current ILED is larger than or equal to the second preset current described in the above embodiments.

Nevertheless, in other embodiments, the definitions of the second preset current can be different. For example, the second preset current may be defined as the current value of the fault detection current ILED that can be measured when one of the LED strings S1~Sn has one LED being short-circuited. In this case, as long as one of the LED strings S1~Sn has one LED being short-circuited, the system terminal will make the LED control circuit stop driving the LED string. According to the above descriptions, the definition of the second present current is not restricted.

It should be noted that, for ease of illustration, in the above embodiments, the LED strings have the same number of LEDs and sizes of the LEDs are equal, such that the voltage drops of the LEDs can be equal.

To sum up, a short circuit and an open circuit occuring in LED strings can be detected according to a fault detection signal generated by the present disclosure. Then, as a response, by the control of a system terminal, the present disclosure can stop driving or continue to drive the LED string having an LED that forms a short circuit, or can disable an LED driving circuit coupled to the LED string having an LED that forms an open circuit.

Moreover, in the present disclosure, the first voltage is designed as a low voltage such that the LED fault detection circuit operates at a low voltage. Therefore, circuit elements used in this present disclosure can be protected from being damaged by a high voltage. Also, no high-voltage element will be needed.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A light-emitting diode (LED) fault detection circuit, coupled between an LED string and an LED driving circuit, comprising:
   a current source, providing a first current;
   a detection resistor, wherein a first end of the detection resistor is coupled to a node between the LED string and the LED driving circuit, and a second end of the detection resistor is coupled to the current source; and
   a first circuit, coupled to the current source and the detection resistor;

wherein after the LED string is driven by the LED driving circuit, a detection current flows through the detection resistor, the first circuit generates a fault detection signal according to the sum of the first current and the detection current, and the LED driving circuit stops driving or continues to drive the LED string according to the fault detection signal;

wherein when at least one LED of the LED string forms a short circuit, a fault detection current generated by the first circuit is larger than a first preset current, and when the fault detection current is larger than or equal to a second preset current, the LED driving circuit stops driving the LED string according to the fault detection signal; and wherein the second preset current is larger than the first preset current.

2. The LED fault detection circuit according to claim 1, wherein the first circuit includes:
a first transistor and a second transistor, wherein the first transistor and the second transistor form a current mirror; and
a first operational amplifier, wherein the inverting input end of the first operational amplifier receives a first voltage, the non-inverting input end of the first operational amplifier is coupled to the current source and the second end of the detection resistor, and the output end of the first operational amplifier is coupled to the current mirror;
wherein due to the current mirror, the first circuit generates the fault detection current according to the sum of the first current and the detection current, such that the fault detection signal is outputted from a detection pin.

3. The LED fault detection circuit according to claim 2, wherein a first end of the first transistor is coupled to the current source and the second end of the detection resistor, a second end of the first transistor is grounded, and a third end of the first transistor is coupled to the output end of the first operational amplifier;
wherein a first end of the second transistor is coupled to the detection pin to output the fault detection signal, a second end of the second transistor is grounded, and a third end of the second transistor is coupled to the third end of the first transistor.

4. The LED fault detection circuit according to claim 2, wherein the fault detection signal is related to the voltage of the node between the LED string and the LED driving circuit.

5. The LED fault detection circuit according to claim 4, wherein when each LED of the LED string works normally, the fault detection current is equal to the first preset current.

6. The LED fault detection circuit according to claim 5, wherein the detection current is zero and the fault detection current is smaller than the first current when any LED of the LED string forms an open circuit.

7. The LED fault detection circuit according to claim 5, wherein the detection current is zero and the fault detection current is smaller than the first current when the node between the LED string and the LED driving circuit is short to ground.

8. The LED control circuit according to claim 1, wherein the LED driving circuit includes:
a driving transistor, wherein a first end of the driving transistor is coupled to the LED string and the LED fault detection circuit, and a second end of the driving transistor is grounded through a resistor; and
a second operational amplifier, wherein the non-inverting input end of the second operational amplifier receives a reference voltage, the inverting input end of the second operational amplifier is coupled to the second end of the driving transistor, and the output end of the second operational amplifier is coupled to a third end of the driving transistor.

9. A light-emitting diode (LED) control circuit for controlling a plurality of LED strings, comprising:
a plurality of LED driving circuits, wherein each LED driving circuit is coupled to a corresponding one of the LED strings; and
an LED fault detection circuit, wherein through a plurality of switch units, the LED fault detection circuit is coupled between each of the LED strings and the LED driving circuits, and the LED fault detection circuit includes:
a current source, providing a first current;
a detection resistor, wherein through the switch units, a first end of the detection resistor is coupled to a node between each of the LED strings and the LED driving circuits, and a second end of the detection resistor is coupled to the current source; and
a first circuit, coupled to the current source and the detection resistor;
wherein after the LED strings are driven by the LED driving circuits, a detection current flows through the detection resistor when at least one LED of one of the LED strings forms a short circuit, the first circuit generates a fault detection signal according to the sum of the first current and the detection current, and one of the LED driving circuits continues to drive or stops driving the one of the LED strings according to the fault detection signal;
wherein when at least one LED of the LED string forms a short circuit, a fault detection current generated by the first circuit is larger than a first preset current, and when the fault detection current is larger than or equal to a second preset current, the LED driving circuit stops driving the LED string according to the fault detection signal; and
wherein the second preset current is larger than the first present current.

10. The LED control circuit according to claim 9, wherein when some of the LED strings respectively have at least one LED forming a short circuit, the detection current flows through the detection resistor, the first circuit generates the fault detection signal according to the sum of the first current and the detection current, and some of the LED driving circuits continue to drive or stop driving the some of the LED strings according to the fault detection signal.

11. The LED control circuit according to claim 9, wherein the first circuit includes:
a first transistor and a second transistor, wherein the first transistor and the second transistor form a current mirror; and
a first operational amplifier, wherein the inverting input end of the first operational amplifier receives a first voltage, the non-inverting input end of the first operational amplifier is coupled to the current source and the second end of the detection resistor, and the output end of the first operational amplifier is coupled to the current mirror;
wherein due to the current mirror, the first circuit generates the fault detection current according to the sum of the first current and the detection current, such that the fault detection signal is outputted from a detection pin.

12. The LED control circuit according to claim 11,
wherein a first end of the first transistor is coupled to the current source and the second end of the detection resistor, a second end of the first transistor is grounded, and a third end of the first transistor is coupled to the output end of the first operational amplifier;
wherein the first end of the second transistor is coupled to the detection pin to output the fault detection signal, a second end of the second transistor is grounded, and a third end of the second transistor is coupled to the third end of the first transistor.

13. The LED control circuit according to claim 11, wherein the fault detection signal is related to the voltage of the node between one of the LED strings and one of the LED driving circuits.

14. The LED control circuit according to claim 13, wherein the detection current is zero when each LED of the LED strings works normally.

15. The LED control circuit according to claim 11, wherein each LED driving circuit includes:
a driving transistor, wherein a first end of the driving transistor is coupled to the LED fault detection circuit and the LED string coupled to the LED driving circuit, and a second end of the driving transistor is grounded through a resistor; and
a second operational amplifier, wherein the non-inverting input end of the second operational amplifier receives a reference voltage, the inverting input end of the second operational amplifier is coupled to the second end of the driving transistor, and the output end of the driving resistor is coupled to a third end of the driving transistor.

16. The LED control circuit according to claim 9, wherein the switch units are diodes.

* * * * *